June 19, 1962  M. POLLMANN  3,039,587
DEVICE FOR TRANSFERRING ROD-SHAPED ARTICLES SUCH AS
CIGARETTES, FILTER BODIES THEREFOR, AND SIMILAR
ARTICLES FROM ONE ROTARY DELIVERY DRUM TO
ANOTHER ROTARY RECEIVING DRUM
Filed May 14, 1959
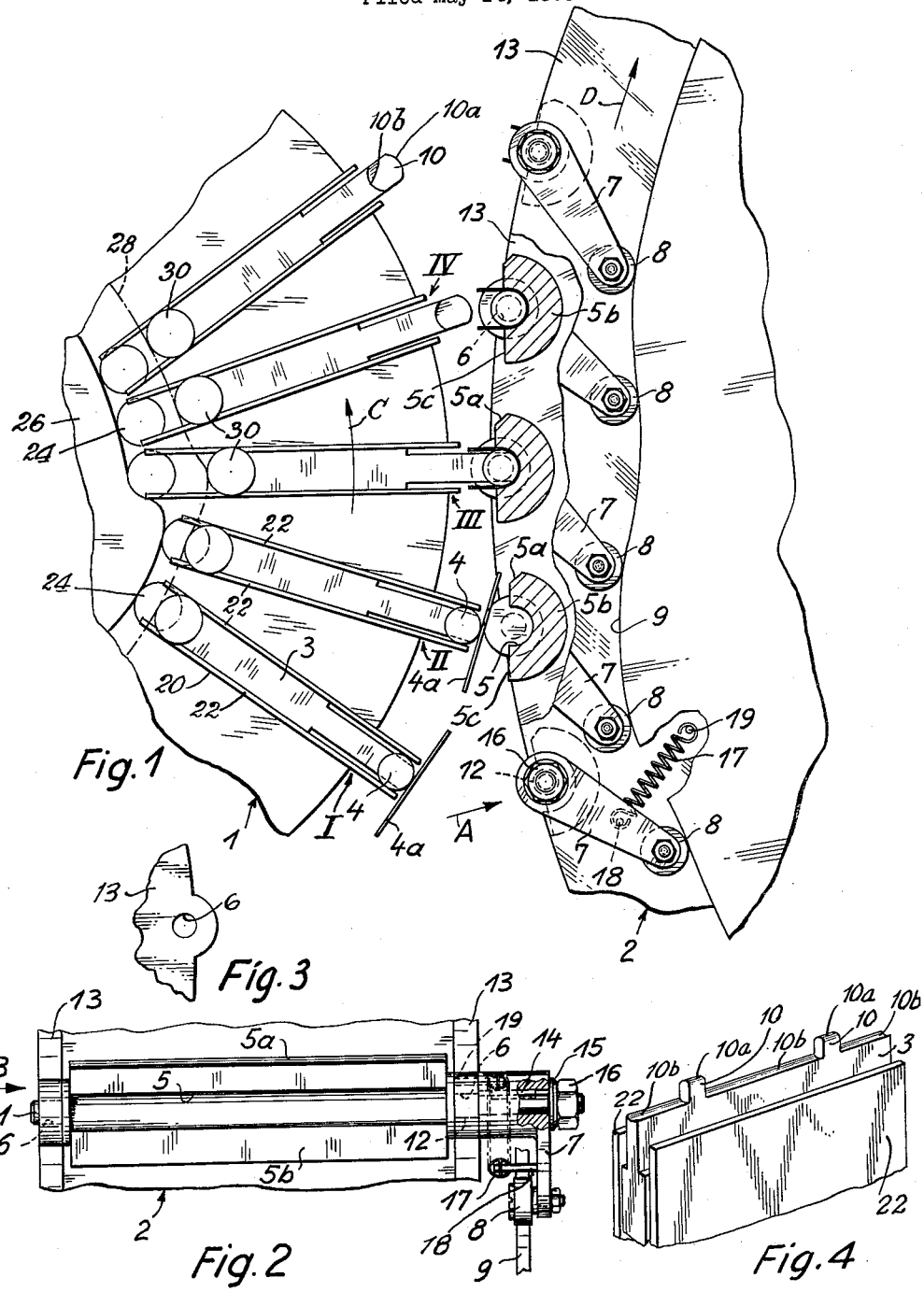

United States Patent Office 3,039,587
Patented June 19, 1962

3,039,587
DEVICE FOR TRANSFERRING ROD-SHAPED ARTICLES SUCH AS CIGARETTES, FILTER BODIES THEREFOR, AND SIMILAR ARTICLES FROM ONE ROTARY DELIVERY DRUM TO ANOTHER ROTARY RECEIVING DRUM
Max Pollmann, Hamburg, Bergedorf, Germany, assignor to Hauni-Werke Körber & Co. K.G., Hamburg-Bergedorf, Germany
Filed May 14, 1959, Ser. No. 813,173
Claims priority, application Germany May 17, 1958
5 Claims. (Cl. 198—22)

The present invention relates to improvements in devices for transferring rod-shaped articles such as cigarettes, filter bodies for the same and similar articles from one rotary drum to another drum which drum form a part of a cigarette making machine.

When rod-shaped objects, for instance cigarettes, filter bodies or similar articles are to be transferred from a rotary delivery drum to another rotary receiving drum the respective grooves on the circumference of the two drums are arranged to cooperate with one another in such a manner that they come into registration only at the moment when the axes of said grooves intersect a line which connects the two axes of the rotary drums. This registration of the grooves on the two rotary drums is of a very short duration. Such a transfer is therefore one of the critical points in the operation of the machines, particularly in case of machines for manufacturing filter tip cigarettes and filter bodies for the cigarettes in which the rod-shaped bodies are transferred by the transverse conveying method, and in which the rod-shaped articles are transferred repeatedly from one rotary drum to another.

This transfer is particulary difficult in cases in which the diameter of the drums, for instance, the one of the receiving drum is greater than the diameter of the division circle of the axial grooves on said drum. This is the case, for instance, when groups of several axially aligned rods have gaps between them in which filter bodies are placed which have to be held in predetermined positions in the grooves of the receiving drum without the benefit of suction conduits. In such cases is is customary to provide on the delivery drum radially movable members for pushing these groups of rods into the grooves of the receiving drum.

It is an object of the invention to prolong the transfer time of the rod-shaped articles and to eliminate any disturbances. This object is obtained by a novel arrangement of the cooperating grooves. In accordance with the present invention, the grooves of at least one of the two drums are arranged in separate, substantially semi-circular bars which are rotatably mounted in the rotary drum body near the perimeter thereof. These bars are provided with grooves for receiving the rod-shaped articles and the bars are rotatable about the axes of these grooves. The rotation of the grooved bars is controlled by a cam so that they operate in such a manner that the cooperating grooves remain in registration or in a suitable alinement an extended predetermined length of time during the transfer period.

In case it is required to transfer groups of filter bodies which have attached to a portion of their perimeter a straight connecting band into the grooves of the receiving drum, the intermediate areas of the drum between the grooved bars or the outer leading edges of the grooved bars are cut away to such an extent that the outermost or leading ends of said connecting bands may enter into the transfer zone between the drums without touching the body of the receiving drum.

An embodiment of the invention is shown in the accompanying drawing, in which—

FIG. 1 is an elevation and partial section of parts of a delivery drum and a cooperating receiving drum, FIG. 2 is a fractional view and partial section of the receiving drum seen in the direction indicated by the arrow A in FIG. 1, FIG. 3 shows a detail of the receiving drum seen in the direction indicated by the arrow B in FIG. 2, FIG. 4 shows in detail the projection on the plunger of the delivery drum.

In the drawing, a delivery drum 1 is provided with circumferentially and equidistantly spaced radial slots 20 in each of which a pair of thin plates 22 are mounted for sliding movement in a radial direction. Each pair of plates 22 is provided with a roller 24 rotatably mounted at the inner end of the plates and maintained in engagement with a cam 26 by suitable yielding means (not shown). The cam 26 is secured to the machine frame (not shown) and is, thus, stationary.

A second cam 28 is secured to the machine frame adjacent to or within the delivery drum 1 for similar engagement with a series of rollers 30, each rotatably mounted on the inner end of an axially elongated plunger 3 which is slidable radially between the plates 22 and yieldably urged inwardly by spring means (not shown). At the outer end, each of said plungers 3 is provided with a block 10 which extends part way only of the axial width of the plunger 3 and has a rounded front, or outer, end surface 10a.

A receiving drum 2 is rotatably mounted adjacent to the delivery drum 1 with its axis parallel with the axis of said delivery drum 1. The receiving drum 2 has parallel end walls 13 provided with a plurality of pairs of coaxial bearings 6 having their axes parallel with the axes of the drum 1, 2. The bearings 6 are spaced circumferentially of the drum 2, as shown.

In each pair of bearings 6, a pair of pivot pins projecting axially from the ends of a bar 5b are pivotally mounted so that the bar 5b extends parallel with the axis of the receiving drum 2. Each bar 5b is substantially semi-cylindrical in cross-section and has in its plane surface a longitudinal groove 5 of substantially the same radius as the rounded end surface 10a of the blocks 10. A lever 7 is non-rotatably secured to the pivot pin 12 by means of a key 14, a washer 15, and a nut 16.

At its free end, each lever 7 has a rotatably mounted roller 8 for engagement with a cam 9 secured to the machine frame (not shown) adjacent to the receiving drum 2. The rollers 8 are maintained in engagement with the cam 9 by springs 17 secured to the levers 7 at 18 and to the drum 2 at 19. The directions of rotation of the drums 1, 2 are indicated by arrows C and D, respectively.

In operation, before the slot marked I in FIG. 1 has reached the position indicated, a plurality of filter plugs 4 have been placed in the space between the pair of plates 22 by means, not shown. For example, if the width of the drums 1, 2 is sufficient to accommodate four recessed filter tips in a row between each pair of plates 22 and in each groove 5, then each plunger 3 is provided with two projecting blocks 10 so spaced that two filter plugs 4 may be placed end to end between the two blocks 10, the other two filter plugs 4 being disposed at the outer sides of the blocks. The length of each block 10 axially of the delivery drum 1 would be twice the depth of the recess in a finished filter tip. In other words, between a pair of plates 22 there would be, counted from one end of the drum 1 to the other, first a filter plug 4, then a block 10, then two filter plugs end to end, then a second block 10, and finally a fourth filter plug 4. The filter plugs would, of course, be held against the rounded surfaces 10b of the plungers. Naturally, the blocks 10 could be made to correspond each to one recess depth only, and the number of filter plugs in a groove may be varied, as desired.

Also accomplished by means not shown prior to the slot I reaching the position shown, a wrapping band 4a is tacked to the filter plugs 4 in the position indicated. It will be noted that in the positions I and II the plates 22 are held by the cam 26, acting upon the rollers 24, in a protruding position relative to the circumference of the drum 1, while at the same time the plungers 3 are in a relatively retracted position due to the shape of the cam 28 which is in engagement with the plunger rollers 30. It will also be noted that one longitudinal edge of the bar 5b is cut away at 5a in order to prevent interference with the wrapping band 4a in a position in the vicinity of the position II.

As a slot 20 approaches the position II, the corresponding bar 5b of the receiving drum 2 is rotated slightly in the clockwise direction through the action of the cam 9 upon the corresponding roller 8 and lever 7. Accordingly, at some point between positions II and III when the plates 22 are retracted and the plunger 3 is pushed outwardly due to the shapes of the cams 26, 28, the bar 5b will occupy the angular position that is most favorable for the introduction into the groove 5 of the wrapping band 4a, filter plugs 4, and blocks 10. The rounded surfaces 10a of the blocks 10 cause the wrapping band 4a to be smoothly rounded in the areas where the recesses in the filter tips are to be created and also prevent undue pressure by the wrapping band on the filter plugs.

As the drums 1, 2 continue to rotate, the bar 5b is gradually pivoted in the counterclockwise direction until, in the position III, its plane surface 5c is substantially perpendicular to the connecting line between the centers of the drums 1, 2 and the filter plugs 4 with the wrapping band 4a and the blocks 10 are correctly disposed in the corresponding groove 5, as shown.

Continued rotation of the drums 1, 2 causes further pivotal movement of the bar in the counterclockwise direction and gradual withdrawal of the blocks 10 from the groove 5, while the filter plugs 4 and wrapping band 4a remain in the groove 5, as indicated at IV. It is obvious, therefore, that the structure described above, provides for a smooth and gradual transfer from the delivery drum 1 to the receiving drum 2 with a minimum risk of damage to the delicate filter plugs and wrapping band. The cutting of the wrapping bands to fit the length of the filter plugs may be effected before or after the transfer, as desired.

What I claim is:

1. In a device for transferring rod-shaped objects, such as cigarettes, filter bodies and the like from a rotary delivery drum provided on its periphery with grooves to a similar rotary receiving drum, the drums being arranged with their peripheries adjacent to provide a transfer area therebetween, a plurality of separate grooved bars arranged on the circumference of said receiving drum means for rotatably supporting said grooved bars on said drum about axes which coincide with the axes of the grooves in said grooved bars, and means causing said grooved bars to be rotatably adjusted during the rotation of said receiving drum so that the grooves in said bars will face in substantially the same direction as they approach and move away from said transfer area and will be in proper receiving position with the transfer points of said delivery drum.

2. In a device for transferring rod-shaped objects, such as cigarettes, filter bodies and the like from a rotary delivery drum provided on its periphery with grooves to a similar rotary receiving drum, the drums being arranged with their peripheries adjacent to provide a transfer area therebetween, a plurality of separate grooved bars arranged on the circumference of said receiving drum, means for rotatably supporting said grooved bars on said drum about axes which coincide with the axes of the grooves in said grooved bars, lever arms attached to said grooved bars, and a stationary cam engaged by the free ends of said lever arms, said cam causing said grooved bars to be rotatably adjusted during the rotation of said receiving drum so that the grooves in said bars will face in substantially the same direction toward a plane passing between said drums as they move through the transfer area and will be in proper receiving position with the transfer points of said delivery drum.

3. In a device for transferring rod-shaped objects, such as cigarettes, filter bodies and the like from a rotary delivery drum provided on its periphery with grooves to a similar rotary receiving drum, the adjacent peripheries of said drum forming a transfer area therebetween, a plurality of separate bars provided with semi-circular grooves arranged on the circumference of said receiving drum, means for rotatably supporting said bars on said drum about axes which coincide with the axes of the grooves in said grooved bars, the leading edge of said bars being beveled to accommodate the outer ends of connecting bands which may be attached to the rod-shaped bodies to be transferred, lever arms attached to said bars, and a stationary cam engaged by the free ends of said lever arms, said cam causing said bars to be rotatably adjusted during the rotation of said receiving drum so that the grooves in said bars will face in substantially the same direction as they move through the transfer area and will be in proper receiving position with the transfer points of said delivery drum.

4. In a device for transferring rod-shaped objects, such as cigarettes, filter bodies and the like from a rotary delivery drum provided on its periphery with grooves to a similar rotary receiving drum, the adjacent peripheries of said drums forming a transfer area therebetween, a plurality of separate bars provided with semi-circular grooves arranged on the circumference of said receiving drum, means for rotatably supporting said bars on said drum about axes which coincide with the axes of the grooves in said grooved bars, said bars being semi-circular in cross-section and their circumferences extending concentrically about semi-circular grooves in said bars, the leading edge of said bars being beveled to accommodate the outer ends of connecting bands which may be attached to the rod-shaped bodies to be transferred, lever arms attached to said bars, and a stationary cam engaged by the free ends of said lever arms, said cam causing said bars to be rotatably adjusted during the rotation of said receiving drum so that the grooves in said bars will face in substantially the same direction as they move through the transfer area and will be in proper receiving position with the transfer points of said delivery drum.

5. In a device for transferring rod-shaped objects, such as cigarettes, filter bodies and the like from a rotary delivery drum provided on its periphery with grooves to a similar rotary receiving drum, a plurality of separate bars provided with semi-circular grooves arranged on the circumference of said receiving drum and transfer drum, means for rotatably supporting said receiving bars on said drum about axes which coincide with the axes of the grooves in said grooved bars therein, axially spaced projections on the concave surface of the grooves of the transferring drum, said projections being arranged for entering into the grooves of the receiving drum and occupy spaces between the filter plugs forming said recess filter plug rods.

References Cited in the file of this patent

UNITED STATES PATENTS 2,621,841    Simpson _____ Dec. 16, 1952